US011454172B2

(12) United States Patent
Sridharan et al.

(10) Patent No.: US 11,454,172 B2
(45) Date of Patent: Sep. 27, 2022

(54) STARTER/GENERATOR SYSTEM

(71) Applicant: Unison Industries, LLC, Jacksonville, FL (US)

(72) Inventors: Balamurugan Sridharan, Bangalore (IN); David Raju Yamarthi, Bangalore (IN); Parmeet Singh Chhabra, Bangalore (IN); Brian Christopher Kemp, Troy, OH (US); Shiloh Montegomery Meyers, Miamisburg, OH (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 16/727,361

(22) Filed: Dec. 26, 2019

(65) Prior Publication Data
US 2021/0199055 A1 Jul. 1, 2021

(51) Int. Cl.
*F02C 7/26* (2006.01)
*H02K 7/18* (2006.01)
*H02K 7/20* (2006.01)
*H02K 11/22* (2016.01)
*H02K 11/01* (2016.01)

(52) U.S. Cl.
CPC ............. *F02C 7/26* (2013.01); *H02K 7/1823* (2013.01); *H02K 7/20* (2013.01); *H02K 11/01* (2016.01); *F05D 2220/32* (2013.01); *F05D 2260/85* (2013.01)

(58) Field of Classification Search
CPC ....... F02C 7/26; H02K 11/022; H02K 7/1823; H02K 7/20; F05D 2260/85; F05D 2220/32
See application file for complete search history.

(56) References Cited

U.S. PATENT DOCUMENTS

| | | | |
|---|---|---|---|
| 6,794,781 B2 | 9/2004 | Razzell et al. | |
| 7,750,521 B2 | 7/2010 | Qu et al. | |
| 7,791,235 B2 | 9/2010 | Kern et al. | |
| 8,063,526 B2 | 11/2011 | Bright | |
| 8,482,171 B2 | 7/2013 | Edwards | |
| 2007/0222220 A1 | 9/2007 | Huang et al. | |
| 2008/0174194 A1* | 7/2008 | Qu | H02K 21/12 310/114 |
| 2011/0062817 A1* | 3/2011 | Makiyama | H02K 15/022 310/216.054 |
| 2011/0241465 A1* | 10/2011 | Anghel | H02K 19/28 310/114 |
| 2013/0320681 A1 | 12/2013 | Karmaker et al. | |
| 2016/0258356 A1 | 9/2016 | Lerg et al. | |
| 2017/0070106 A1* | 3/2017 | Guo | H02K 7/083 |
| 2017/0107910 A1 | 4/2017 | Huang | |
| 2018/0266329 A1 | 9/2018 | Mackin | |
| 2018/0328286 A1* | 11/2018 | Nayak | F01D 25/24 |
| 2019/0165708 A1* | 5/2019 | Smith | F01D 19/00 |

FOREIGN PATENT DOCUMENTS

EP     1353436 A2     10/2003

* cited by examiner

*Primary Examiner* — Joseph Ortega
(74) *Attorney, Agent, or Firm* — McGarry Bair PC

(57) ABSTRACT

A starter/generator system that includes a first and second electric machine. The first electric machine has a first rotor and a first stator where the first rotor is adapted to receive kinetic energy and the first stator includes a first set of windings. The second electric machine has a second rotor rotatable and a second stator. The second stator is fixed relative to the first stator and the second stator includes a second set of windings.

20 Claims, 6 Drawing Sheets

STARTER/GENERATOR SYSTEM

TECHNICAL FIELD

The disclosure generally relates to a starter/generator system with first and second electric machines for starting an engine, specifically a starter/generator system for starting a turbine engine.

BACKGROUND

A driving mechanism, such as a motor or engine, can generate driving forces at an output, such as at a rotatable output shaft. The output shaft can, for example, provide a rotational kinetic motion to another piece of equipment via a rotatable drive shaft connected to the output shaft. In turn, the rotational kinetic motion can be utilized as an energy source to operate. In one example configuration, a gas turbine engine, also known as a combustion turbine engine, is a rotary engine that can obtain, at least in part, some energy from a driving mechanism such as a starter.

BRIEF DESCRIPTION

In one aspect, the disclosure relates to a starter/generator (S/G) system that includes a first electric machine having a first rotor rotatable relative to a first stator and a second electric machine having a second rotor rotatable relative to a second stator. The first rotor is adapted to receive a kinetic source and the first stator includes a first set of windings. The second stator is fixed relative to the first stator and the second stator includes a second set of windings. An S/G kinetic input/output is rotationally coupled with the second rotor, and an S/G power output is electrically connected with the second set of windings.

In another aspect, the disclosure relates to a method of operating a starter/generator (S/G) system. The method includes operating in a first starting mode by kinetically driving a first rotor to generate current in a first set of windings in a first stator. The generated current in the first set of windings is supplied to a second set of windings in a second stator to induce rotation of a second rotor. The second stator rotates a S/G system kinetic input/output to start an engine. Operating in a second generating mode, the S/G kinetic input/output is kinetically driven to rotate the second rotor to generate current in the second set of windings that is supplied to a S/G power output.

DETAILED DESCRIPTION

Figure 1:
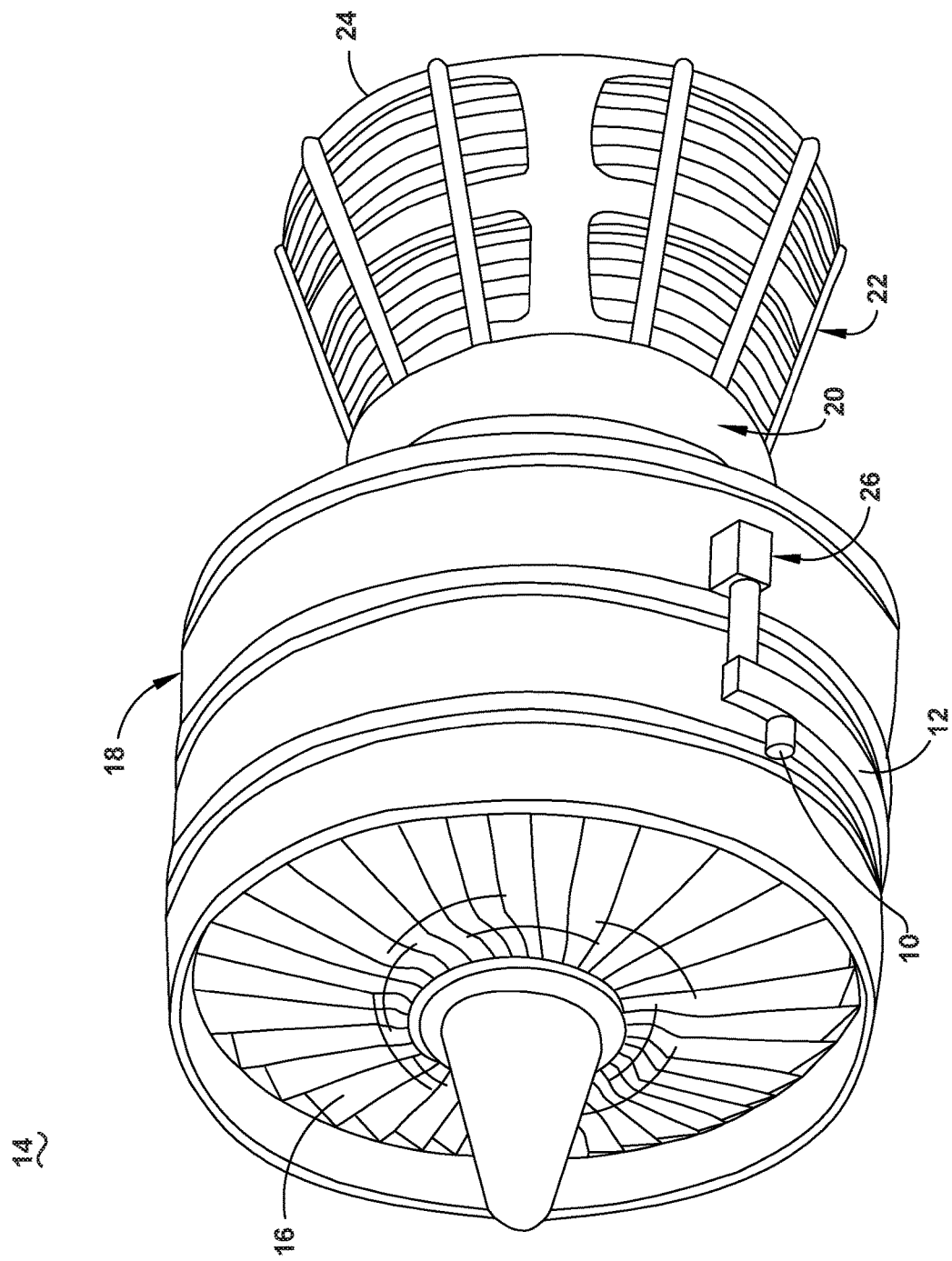
FIG. 1 is a schematic illustration of a turbine engine with a starter/generator system, in accordance with various aspects described herein.

Aspects of the disclosure described herein are directed to a turbine engine with a starter that includes a starter/generator system. For purposes of illustration, the present disclosure will be described with respect to a starter for an aircraft turbine engine. For example, the disclosure can have applicability in other vehicles or engines, and can be used to provide benefits in industrial, commercial, and residential applications as further described in FIG. 6.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Referring to FIG. 1, a starter, such as a starter/generator (S/G) system 10 is coupled to an accessory gear box (AGB) 12, also known as a transmission housing, and together are schematically illustrated as being mounted to a turbine engine 14 such as a gas turbine engine. The turbine engine 14 comprises an air intake with a fan 16 that supplies air to a high-pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low-pressure turbine can be coupled to the fan 16 of the air intake by way of a shaft to power the fan 16.

The turbine engine 14 can be a turbofan engine, such as a General Electric GEnx or CF6 series engine, commonly used in modern commercial and military aviation or it could be a variety of other known turbine engines such as a turboprop or turboshaft. The turbine engine can also have an afterburner that burns an additional amount of fuel downstream of the low pressure turbine region 24 to increase the velocity of the exhausted gases, and thereby increasing thrust.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. During starting operating conditions, the S/G system 10 can utilize a source of energy to drive kinetic energy or power from the S/G system 10 to initiate self-sustaining combustion or "normal running" operating conditions of the gas turbine engine 14. For example, in one non-limiting example, a source of pressurized air can be utilized to begin rotation of a set of rotors of the turbine engine 14 by way of the AGB 12 and mechanical power take-off 26, until a rotational speed of the set of rotors is high enough to be able to initiate a self-sustaining combustion cycle of turbine engine operation. Under normal running operating conditions, the mechanical power take-off 26 translates power from the turbine engine 14 to the AGB 12 to power accessories of the aircraft for example but not limited to fuel pumps, electrical systems, and cabin environment controls. The S/G system 10 can be mounted on the outside of either the air intake region containing the fan 16 or on the core near the high pressure compression region 18.

Figure 2:
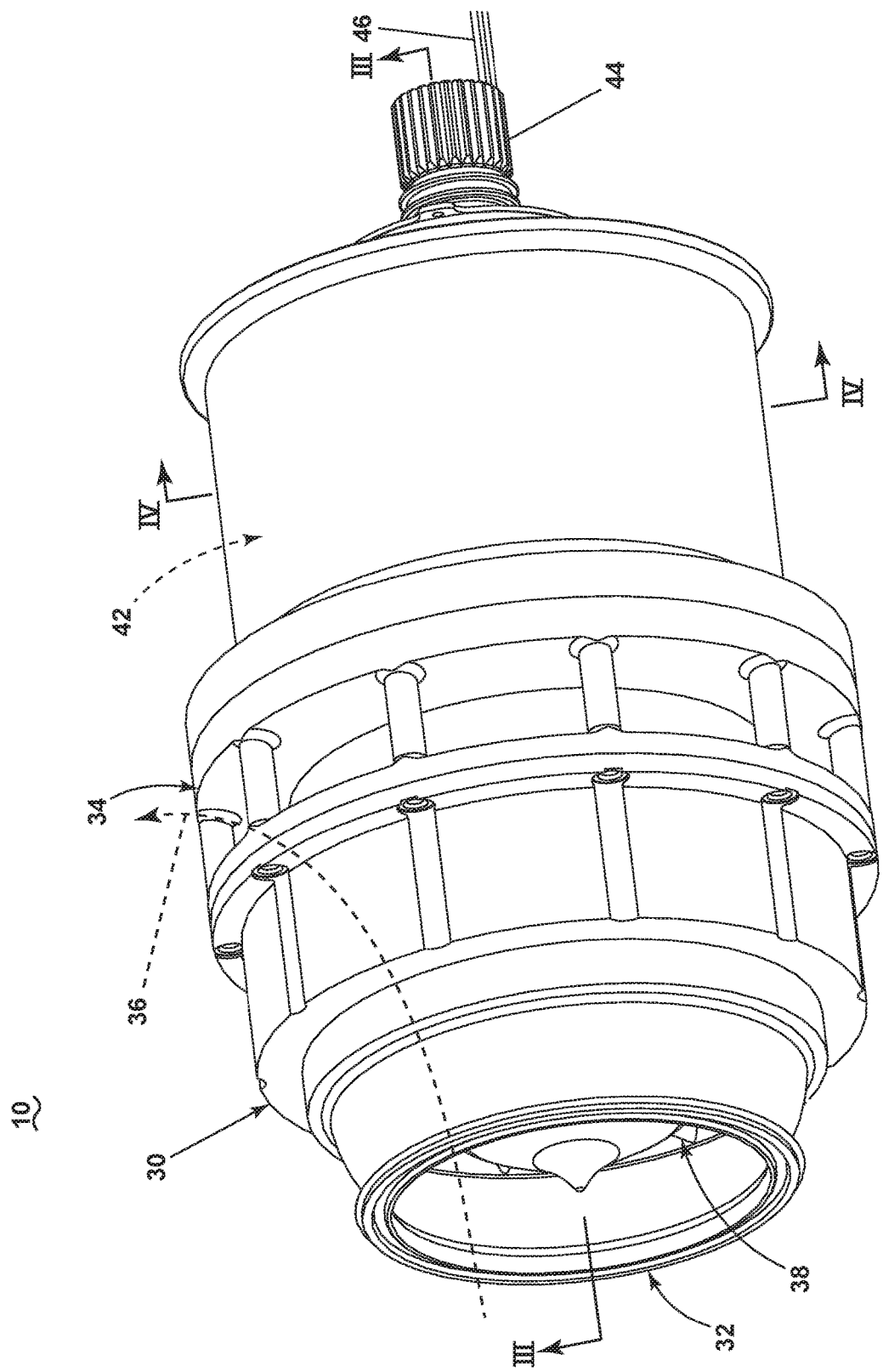
FIG. 2 is a perspective view of the starter/generator system of FIG. 1, in accordance with various aspects described herein.

Referring now to FIG. 2, the S/G system 10 is shown in greater detail. Generally, the S/G system 10 includes a housing 30 defining an inlet 32, an outlet 34, and a fluid flow path 36 extending between the inlet 32 and outlet 34 for communicating a flow of fluid therethrough. In one non-limiting example the fluid is air, such as pressurized air, that is supplied from a pressurized air source, including but not limited to, a ground-operating air cart, an auxiliary power unit, or a cross-bleed start from an engine already operating. The S/G system 10 includes a turbine system 38 journaled within the housing 30 and disposed within the flow path 36 for rotatably extracting mechanical power from the flow of gas along the flow path 36. An electric machine system 42 is mounted within the housing 30. The electric machine system 42 can include a S/G kinetic input/output 44, that is, the S/G kinetic input/output can be adapted or operable to receive a kinetic input or supply or provide a kinetic output, and a S/G power output 46, wherein electricity, current, voltage, power, or the like, can be supplied from the S/G system 10 to another component, such as a power distribution system or an electrical load.

Figure 3:
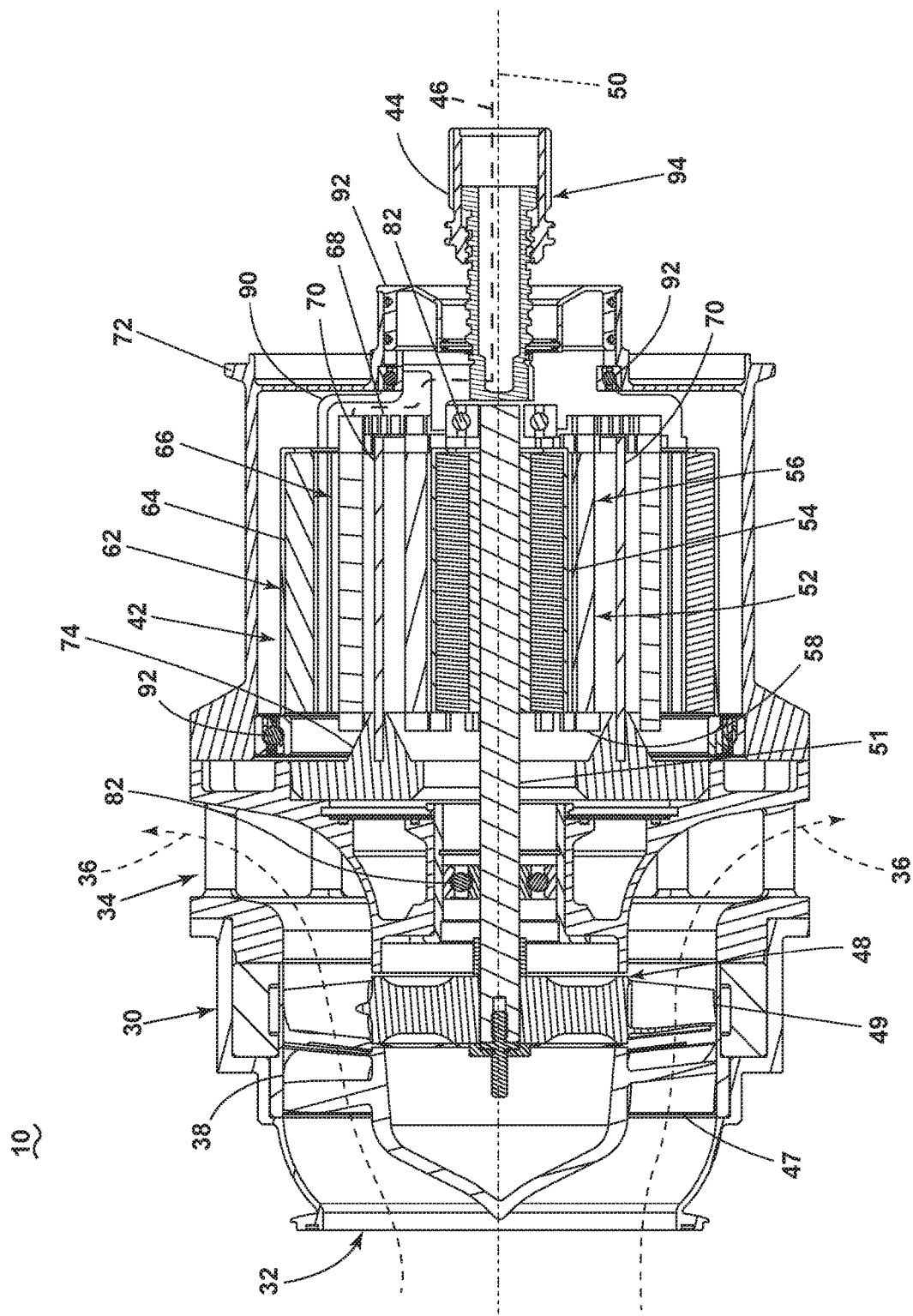
FIG. 3 is a schematic cross-sectional view of the starter/generator system taken along line III-III of FIG. 2, in accordance with various aspects described herein.

FIG. 3 is a cross section along the line III-III from FIG. 2, further illustrating the S/G system 10, which can include the turbine system 38 and the electric machine system 42. The turbine system 38 of the S/G system 10 can include, but is not limited to, a stationary portion 47 that can at least direct air in the flow path 36 to a rotatable portion 48. The rotary portion 48 can include a set of rotor blades 49 that couple to a drive shaft 51 that can rotate about a centerline 50 of the S/G system 10. Alternatively, the blades 49 or the drive shaft 51 can rotate about any axis relative to the S/G system 10.

The electric machine system 42 can include a first electric machine 52 and a second electric machine 62. It is contemplated that the first electric machine 52 can be an inner machine and the second electric machine can be an outer machine. As illustrated, by way of non-limiting example, the first electric machine 52 can be positioned or located concentric or coaxial with, or relative to, the second electric machine 62. Stated another way, the second electric machine 62 can at least partially envelop, overlie, or receive the first electric machine 52 within a radial cavity of the second electric machine 62. The second electric machine 62 can be concentric or coaxial to the first electric machine 52. That is, the second electric machine 62 can be located at the same or similar axial position as the first electric machine 52 or the second electric machine 62 can be located at a greater radial distance than the first electric machine 52. It is contemplated that the second electric machine 62 at least partially axially overlies the first electric machine 52. Alternatively, the second electric machine 62 does not axially overlie the first electric machine 52. Further, any location or orientation of the first and second electric machines 52, 62 is contemplated.

The electric machine system 42 can include a magnetic shield 70, a kinetic source or the drive shaft 51, and a carrier 90. The first electric machine 52 can include a first rotor 54 rotatably connected with the drive shaft 51 and configured to rotate relative to a stationary (i.e. non-rotating) first stator 56. By way of non-limiting example, the first rotor 54 can be an inner rotor. The first stator 56 can include first set of windings 58.

The second electric machine 62 can include a second rotor 64 rotatable relative to a stationary second stator 66 and rotatably connected with the S/G kinetic input/output 44. The second rotor 64 can be an outer rotor. As explained herein, the first rotor 54 and the second rotor 64 can be independently rotatable. The second stator 66 can include second set of windings 68 electrically connected with the S/G power output 46. It is contemplated that the first stator 56 and the second stator 66 is fixed relative to the housing 30. It is further contemplated that the first set of windings 58 of the first stator 56 can be in selective electrical communication with the second set of windings 68 of the second stator 66. That is, when selectably enabled, current can flow between the first and second sets of windings 58, 68.

The magnetic shield 70 can be included in the electric machine system 42. The magnetic shield 70 can define a magnetically isolating layer to magnetically separate or magnetically isolate the first electric machine 52 from the second electric machine 62. As illustrated, by way of non-limiting example, the magnetic shield 70 can be a radial shield between the first stator 56 and the second stator 66. By way of non-limiting example, the magnetic shield 70 can include high magnetic permeability metal alloys, such as sheets of permalloy and/or Mu-Metal. Additionally, or alternatively, the magnetic shield 70 can include nanocrystalline grain structure ferromagnetic metal coatings, other high-nickel content alloys, or copper.

The S/G system 10 can include a S/G housing 72 circumscribing at least one of the first or the second electric machines 52, 62. The S/G housing 72 can couple to or be formed as part of the housing 30. The S/G housing 72 or the housing 30 can include or couple to a receiving portion 74 that can receive or secure to the magnetic shield 70.

The drive shaft 51 rotatably couples the rotatable portion 48 of the turbine system 38 to the first rotor 54 of the first electric machine 52. The drive shaft 51 allows for the transfer of mechanical power or kinetic energy from the rotatable portion 48 to the first rotor 54. While illustrated as the drive shaft 51, it is contemplated that the first rotor 54 can be adapted to receive any kinetic source or rotation.

At least a pair of shaft bearings 82 rotatably support the drive shaft 51. While illustrated as two shaft bearings 82, it is contemplated that any number or type of known bearings can be used to rotatably support the drive shaft 51.

The carrier 90 can couple the second rotor 64 to the S/G kinetic input/output 44. The carrier 90 can include a rotatable radial arm that carries at least the second rotor 64 at a radial distance spaced from the drive shaft 51. It is contemplated that the distance the second rotor 64 is carried is a larger radial distance from the drive shaft 51 than the radial distance from the drive shaft 51 to the first rotor 54, the first stator 56, or the second stator 66.

Carrier bearings 92 can rotatably support the carrier 90. While illustrated as two carrier bearings 92, it is contemplated that any number or type of known bearings can be used to rotatably support the carrier 90. A component 94 of the AGB 12, such as, by way of non-limiting example, a splined interface, can couple to the S/G kinetic input/output 44. That is, the S/G kinetic input/output 44 can transfer mechanical power or kinetic energy from the electric machine system 42 to the AGB 12.

It is contemplated that the S/G system 10 can contain a lubricant, including, but not limited to, a grease or oil to provide lubrication and cooling to moving parts, that can include, but are not limited to the drive shaft 51, the shaft bearings 82, the carrier 90, the carrier bearings 92, the first rotor 54, the second rotor 64, or the S/G kinetic input/output 44.

The S/G starter 10 can be formed by any known materials and methods, including, but not limited to, additive manufacturing or die-casting of high strength and lightweight metals such as aluminum, stainless steel, iron, or titanium. The housing 30, S/G housing 72, turbine system 38, and electric machine system 42 can be formed with a thickness sufficient to provide adequate mechanical rigidity without adding unnecessary weight to the S/G system 10 and, therefore, the aircraft.

The drive shaft 51 and the S/G kinetic input/output 44 can be constructed by any known materials and methods, including, but not limited to additive manufacturing, extrusion, or machining of high strength metal alloys such as those containing aluminum, iron, nickel, chromium, titanium, tungsten, vanadium, or molybdenum. The diameter of the drive shaft 51 or the S/G kinetic input/output 44 can be fixed or vary along the axial length.

Figure 4:
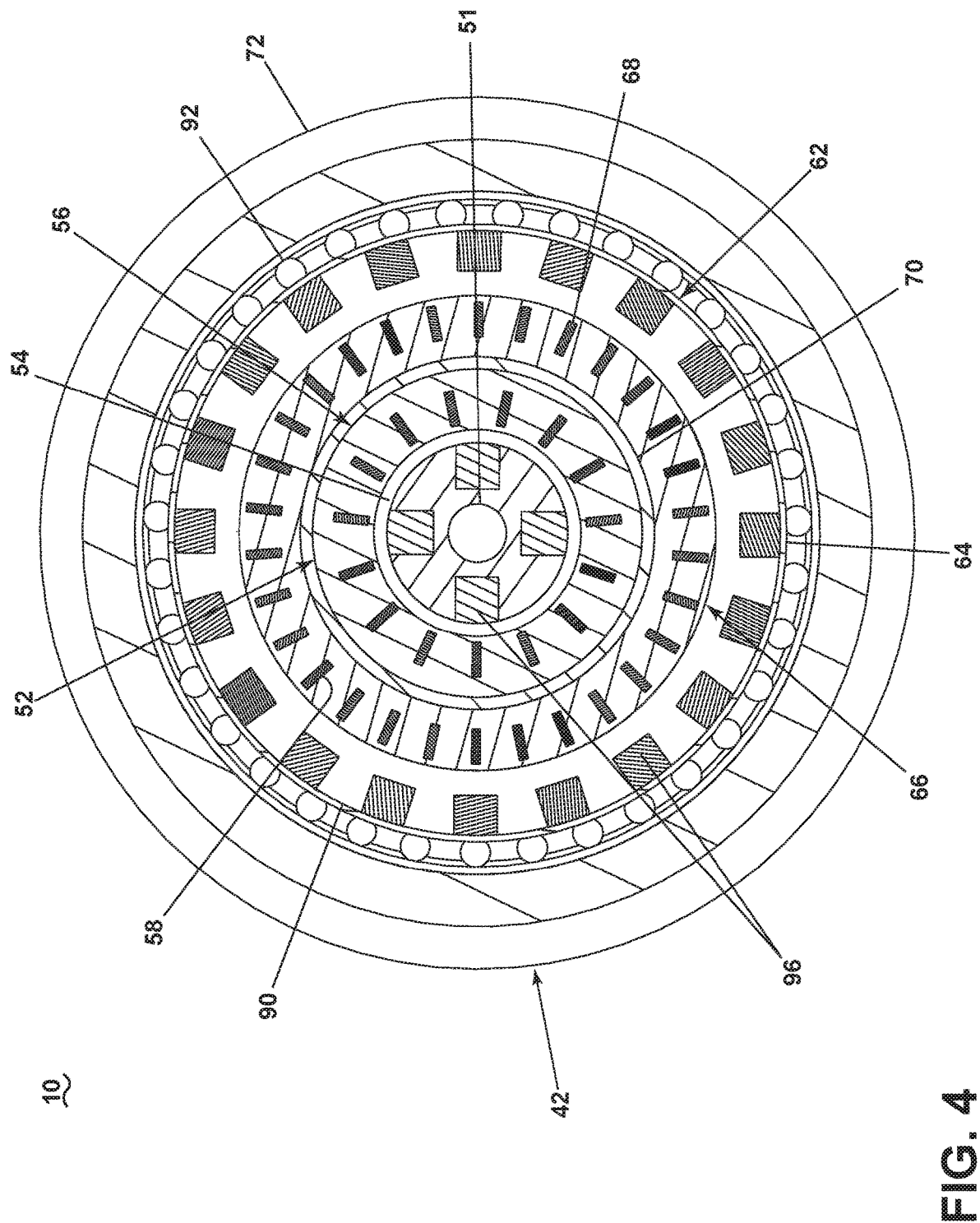
FIG. 4 is a schematic cross-sectional view of the starter taken along line IV-IV of FIG. 2, in accordance with various aspects described herein.

FIG. 4 is another cross section along lines IV-IV from FIG. 2 to further illustrates a portion of the electric machine system 42. Permanent magnets 96 can be included in the first rotor 54 or the second rotor 64. It is contemplated any number of the permanent magnets 96 can be located at the first or second rotors 54, 64. Additionally, the set of permanent magnets 96 can be circumferentially spaced about the circumference of the respective rotor 54, 64 surface facing the corresponding stator 56, 66. Similarly, any number of windings can be used in the first and second sets of windings 58, 68. It is contemplated that at least one of the first stator 56 or the second stator 66 is configured or wound to operate in a three-phase stator winding configuration or a six-phase stator winding configuration. In another non-limiting example, it is contemplated that at least one of the first stator 56 or the second stator 66 is configured to selectably operate in either a three-phase stator winding configuration or a six-phase stator winding configuration. In yet another non-limiting example the first stator 56 can be configured, wound, or selectably configured to operation in a dissimilar winding configuration relative to the second stator 66 (e.g. the first stator 56 selected to operate in a three-phase stator winding configuration while the second stator 66 is selected to operate in a six-phase stator winding configuration).

As described herein, in a first starting mode, air supplied along the flow path 36 rotates the blades 49 of the rotatable portion 48 of the turbine system 38 for driving the rotation of the drive shaft 51. The drive shaft 51 rotates the first rotor

54. The first rotor 54 can be a permanent magnet rotor providing a change in magnetic flux through the first set of windings 58 housed by the first stator 56. The change in magnetic flux induces a current in the first set if windings 58. Selectable electrical communication between the first and second set of windings 58, 68 can result in a changing magnetic field at the second stator 66, that induces the rotation of the second rotor 64 and carrier 90. The second rotor 64 is coupled via at least the carrier 90 to the S/G kinetic input/output 44. The S/G kinetic input/output 44 can then provide rotational or mechanical power to the engine 14, for instance, to perform a starting process of the engine 14, as described herein.

In contrast, during operation of a second generating mode, the kinetic or rotational input can be provided to the S/G kinetic input/output 44 and the second electric machine 62 from the engine 14 during normal running operation of the engine 14. The S/G kinetic input/output 44 rotates the second rotor 64 which can induce a current in the second set of windings 68. The second set of windings 68 can provide an electrical power output via the S/G power output 46. In this second generating mode, little or no air is supplied to the inlet 32, and the first electric machine 52 is not utilized, or is disabled.

Figure 5:
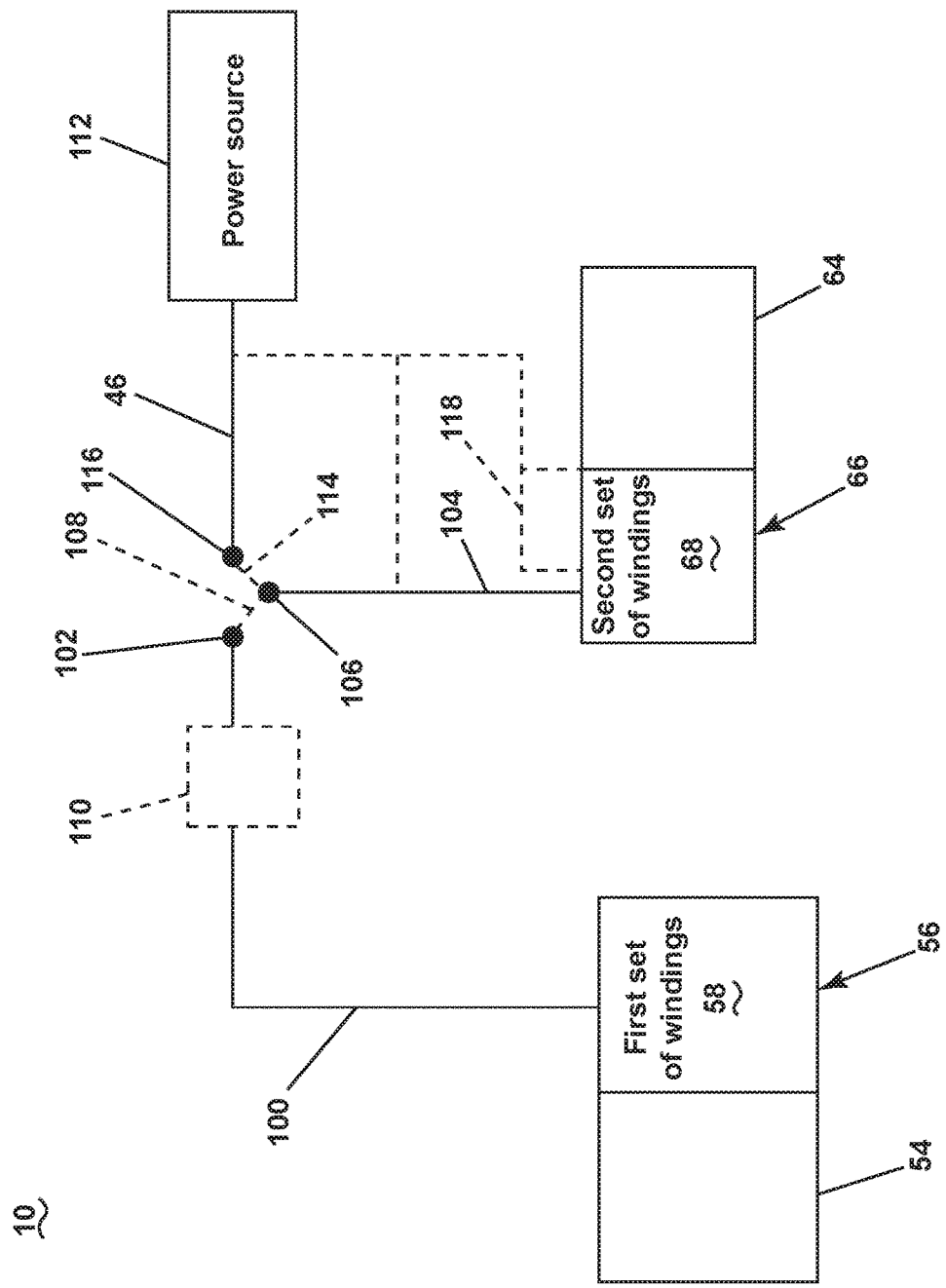
FIG. 5 is schematic illustration of electrical communication for the starter of FIG. 2, in accordance with various aspects described herein.

As illustrated in FIG. 5 the first set of windings 58 can be in selective electrical communication with the second set of windings 68. That is, a first conductive connection 100 with a first terminal 102 can be selectively connected or connectable to a second conductive connection 104 with a second terminal 106 which is selectively conductively connected or connectable with the second set of windings 68, via a switch or first optional connector 108. With the first optional connector 108 selected, the induced current generated in the first set of windings 58 is supplied to the second set of windings 68, inducing a magnetic field at the second set of windings 68. Optionally, a device 110 can alter the flow of induced current as it flows between the first and second sets of winding 58, 68. By way of non-limiting example, the device 110 can be one or more of a controller, transformer, motor, generator, or exciter to operably or controllably excite the induced magnetic field at the second set of windings 68.

Additionally, or alternatively, the device 110, by way of non-limiting example, can controllably switch or modify the effective use of three-phase or six-phase windings, control output to the second set of windings 68 to ensure required power, or switch from the first starting mode to the second generating mode.

As the current flows through the second set of windings 68, the second rotor 64 can be induced or encouraged to rotate. For example, the permanent magnets of the second rotor 64 can rotate in response to the induced magnetic field, generating a torque on the second rotor 64 or the carrier 90. The rotation of the second rotor 64 or the carrier 90, in turn, rotates the S/G kinetic input/output 44. Therefore, during the first starting mode, the S/G system 10 can be the driving mechanism for the turbine engine 14 via rotation of the drive shaft 51, the first and second rotors 54, 64, and the S/G kinetic input/output 44 to start the self-sustaining operation of the engine 14. By way of non-limiting example, the S/G kinetic input/output 44 is coupled to the component 94 of the AGB 12 which supplies mechanical energy to the turbine engine 14 for the purposes of starting the turbine engine 14. It is contemplated that at least one of the first stator 56 or the second stator 66 can operate with the six-phase stator winding during the first starting mode. Operating with the six-phase stator winding generates greater torque on the S/G kinetic input/output 44, compared with operating with the three-phase stator winding.

Additionally, or alternatively, the S/G power output 46 can provide an electrical power input to the second set of windings 68. By way of non-limiting example, a power distribution system or power source 112 can provide power to the second set of windings 68 of the second stator 66 when a switch or second optional connector 114 connects or selectively communicates with a third terminal 116 of the S/G power output 46 to the second terminal 106 and the second conductive connection 104. As used herein, a power source 112 can include, but is not limited to, a battery or another electrical source or system, such as the power distribution system of the aircraft. The power source 112 can provide power to the S/G power output 46 that can input power to the second set of windings 68 during the first starting mode. It is contemplated that the first optional connector 108 or the second optional connector 114 can individually or in any combination provide power to the second set of windings 68 during the first starting mode.

It is further contemplated that an exciter 118 can be used to controllably excite the rotation of the second rotor 64. The exciter 118 can be powered by the current from the first set of windings 58. Additionally, or alternatively, the exciter 118 can be powered by the current from the power source 112. The exciter 118 can include an exciter stator powered by the first set of windings 58 or the power source 112. The exciter stator can then induce the rotation of an exciter rotor. The exciter rotor can couple to a rotating rectifier to provide additional torque to the second rotor 64. Alternatively, the exciter stator can provide additional torque to the second rotor 64 using any known technique.

Once the turbine engine 14 is started, the electric machine system 42 can enter or otherwise operate in the second generating mode. When electric machine system 42 is ready to operate in the second generating mode, the first optional connector 108 can selectively opened or switched off so that electric communication between the first and second sets of windings 58, 68 ceases. Optionally, the air flow through the flow path 36 can decrease or cease prior to, during, or after the switch from the first starting mode to the second generating mode. At least the component 94 of the AGB 12 continues to rotate as a result of the turbine engine 14. That is, the started turbine engine 14 kinetically drives the S/G kinetic input/output 44. The rotation of the S/G kinetic input/output 44 results in the rotation of the second rotor 64 via the carrier 90. The rotation of the second rotor 64 can provide a change in magnetic flux through the second set of windings 68 housed by the second stator 66. The change in magnetic flux through the second set of windings 68 induces a current in the second set if windings 68. When the second optional connector 114 is closed and connects the second terminal 106 to the third terminal 116, power can flow from the second set of windings 68 to the power source 112 via the S/G power output 46. The power source 112 can then output or provide power to a variety of electrical systems or rechargeable batteries. It is contemplated that the power source 112 can be at least a part of a power distribution system for supplying electrical power to other components of the engine 14.

Optionally, the electric machine 42 can be considered a hybrid starter/generator capable of outputting mechanical and electrical power. The electric machine 42 can operate as a magnetic gearbox during the first start mode providing the mechanical energy required to start the engine 14. Once the engine 14 is started, the electrical machine 42 can operate as an electrical generator during the second generation mode. That is, the electrical machine 42 can transform rotational energy input from the started engine 14 into an electrical power output.

Many other possible examples and configurations in addition to those shown in the above figures are contemplated by the present disclosure, both structural and electrical. Additionally, the design and placement of the various components such as the AGB 12, the electric machine system 42, or the S/G system 10 or components thereof can be rearranged such that a number of different in-line configurations could be realized.

Figure 6:
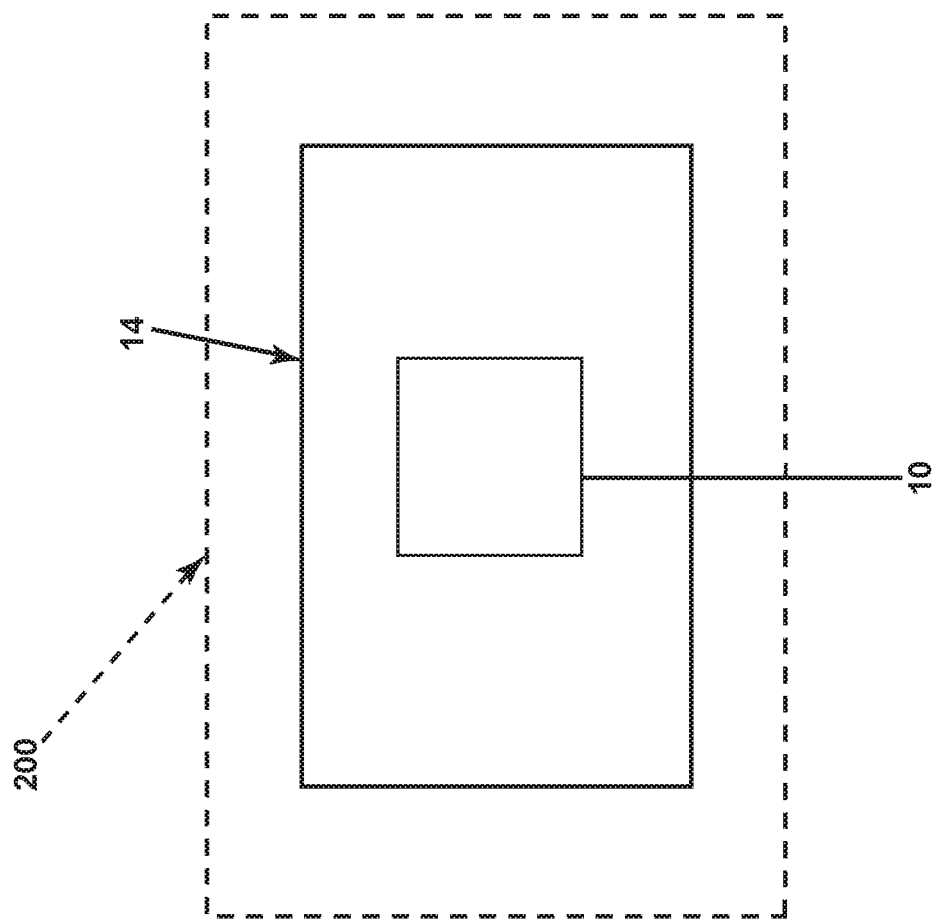
FIG. 6 is a schematic illustration of the turbine engine and starter/generator system from FIG. 1 in a vehicle or structure.

FIG. 6 is a schematic illustration of the turbine engine 14 and starter/generator system 10 from FIG. 1, where the turbine engine 14 can be in a vehicle or structure 200. The vehicle or structure 200 can be, by way of non-limiting example, a helicopter or other aircraft, a boat or other aquatic vehicle, or a car or other land vehicle. Further, the vehicle or structure 200 can be, but is not limited to, a marine power plant, a wind turbine, or a small power plant. It is further considered that the turbine engine 14 can be any engine using a turbine with the starter/generator 10 required by the vehicle or structure 200.

Benefits associated with aspects of the disclosure herein include a S/G system that has the ability to operate in a first starting mode to start a turbine engine and a second generating mode following the starting of the turbine engine. Traditionally, after starting the turbine engine, a starter becomes dead weight for an aircraft or turbine driven vehicle. However, S/G system also includes the second generating mode where the S/G system becomes a continuous supply of electricity to the aircraft or turbine driven vehicle.

Additional benefits include the ability to provide greater torque to start the engine upon the supply of high-pressure air. The first and second electric machines of the S/G system or electric machine consist of different numbers of poles that enable a speed step up/down function. The electrical power transferred from the first electric machine to the second electric machine with a higher pole number can produce a higher torque.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A starter/generator (S/G) system comprising a first electric machine having a first rotor rotatable relative to a first stator, the first rotor adapted to receive a kinetic source and the first stator having a first set of windings, a second electric machine having a second rotor rotatable relative to a second stator, the second stator fixed relative to the first stator, the second stator having a second set of windings, an S/G kinetic input/output rotationally coupled with the second rotor, and an S/G power output electrically connected with the second set of windings.

2. The S/G system of any preceding clause wherein the second electric machine is concentric to the first electric machine.

3. The S/G system of any preceding clause wherein the second electric machine at least partially axially overlies the first electric machine.

4. The S/G system of any preceding clause wherein the first electric machine and the second electric machine are coaxial.

5. The S/G system of any preceding clause wherein a magnetic shield radially separates the first electric machine from the second electric machine.

6. The S/G system of any preceding clause wherein the first rotor and the second rotor are independently rotatable.

7. The S/G system of any preceding clause wherein the kinetic source is a turbine and the S/G system is an air turbine starter/generator.

8. The S/G system of any preceding clause wherein the second set of windings is selectably connected between the first set of windings and the S/G power output.

9. The S/G system of any preceding clause wherein the S/G system operates in a first starting mode, whereby the kinetic source rotatably drives the first rotor to generate current in the first set of windings, wherein the current generated in the first set of windings is supplied to the connected second set of windings, wherein the current supplied to the second set of windings induces rotation of the second rotor, and wherein the rotation of the S/G kinetic input/output operates to start an engine.

10. A gas turbine engine comprising the S/G system of any preceding clause wherein S/G kinetic input/output operates to start the gas turbine engine.

11. The S/G system of any preceding clause wherein the S/G operates in a second generating mode, whereby a started gas turbine engine kinetically drives the S/G kinetic input/output, wherein the rotation of the second rotor relative to the second stator generates current in the second set of windings, and wherein the current generated in the second set of windings is supplied to the connected S/G power output.

12. The S/G system of any preceding clause wherein at least one of the first rotor or the second rotor is a permanent magnet rotor.

13. The S/G system of any preceding clause wherein at least one of the first stator or the second stator can selectably operate with a three-phase stator winding or a six-phase stator winding.

14. The S/G system of any preceding clause wherein the at least one of the first stator or the second stator can operate with the six-phase stator winding during a first starting mode, and wherein operating with the six-phase stator winding generates greater torque on the S/G kinetic input/output, compared with operating with the three-phase stator winding.

15. A method of operating a starter/generator (S/G) system comprising operating in a first starting mode by kinetically driving a first rotor to generate current in a first set of windings in a first stator, supplying the generated current from the first set of windings to a second set of windings in a second stator to induce rotation of a second rotor that rotates a S/G system kinetic input/output to start an engine, and operating in a second generating mode by kinetically driving the S/G kinetic input/output to rotate the second rotor to generate current in the second set of windings that is supplied to a S/G power output.

16. The method of any preceding clause wherein operating in the second generating mode occurs after starting the engine.

17. The method of any preceding clause further comprising, when operating in the first starting mode, controllably supplying current generated in the first set of windings to an exciter for controllably exciting the rotation of the second rotor.

18. The method of any preceding clause wherein, when operating in the first starting mode, supplying current generated in the first set of windings further includes supplying additional current to the second set of windings from an electrical power source to further induce the rotation of the second rotor.

19. The method of any preceding clause wherein at least a portion of the first rotor and the second rotor is concentric.

20. The method of any preceding clause wherein during the first starting mode, receiving a pressurized air source at an input of the S/G system to drive the rotation of the first rotor.

What is claimed is:

1. A method of operating a starter/generator (S/G) system for an engine, the method comprising:
    operating the S/G system as a starter in a first starting mode by kinetically driving a first rotor configured to be driven by pressurized air received at an inlet to generate current in a first set of windings in a first stator, supplying the generated current from the first set of windings to a second set of windings in a second stator to induce rotation of a second rotor that rotates a S/G system kinetic input/output to start the engine, wherein the first rotor and the second rotor are independently rotatable; and
    operating the S/G system as a generator in a second generating mode by kinetically driving the S/G kinetic input/output to rotate the second rotor to generate current in the second set of windings that is supplied to a S/G power output;
    wherein the inlet of the S/G system is different from an air inlet of the engine, and wherein the S/G system is configured to operably switch from the first starting mode to the second generating mode.

2. The method of claim 1 wherein operating in the second generating mode occurs after starting the engine.

3. The method of claim 1 further comprising, when operating in the first starting mode, controllably supplying current generated in the first set of windings to an exciter for controllably exciting the rotation of the second rotor.

4. The method of claim 1 wherein, when operating in the first starting mode, supplying current generated in the first set of windings further includes supplying additional current to the second set of windings from an electrical power source to further induce the rotation of the second rotor.

5. The method of claim 1 wherein the first rotor is rotatably coupled to a drive shaft and the pressurized air received at the inlet rotates the first rotor via the drive shaft.

6. A starter/generator (S/G) system for an engine, the S/G system comprising:
    a first electric machine having a first rotor rotatably coupled to a drive shaft and rotatable relative to a first stator, the first stator having a first set of windings, wherein when the S/G system is in a first starting mode, pressurized air from a pressurized air source supplied at an inlet of the S/G system rotates the first rotor to generate current in the first set of windings in the first stator;
    a second electric machine having a second rotor rotatable relative to a second stator, the second stator fixed relative to the first stator, the second stator having a second set of windings;
    a S/G housing, wherein the S/G housing includes the first electric machine and the second electric machine;
    an S/G kinetic input/output rotationally coupled with the second rotor, wherein the S/G kinetic input/output shaft is adapted to supply a kinetic output to the engine, by way of a gear box mounted to the engine, in the first starting mode or receive a kinetic input from the engine in a second generating mode, wherein the drive shaft and the S/G kinetic input/output independently rotate; and
    an S/G power output electrically connected with the second set of windings.

7. The S/G system of claim 6 wherein the second electric machine at least partially axially overlies the first electric machine.

8. The S/G system of claim 7 wherein the first electric machine and the second electric machine are coaxial.

9. The S/G system of claim 8 wherein a magnetic shield radially separates the first electric machine from the second electric machine.

10. The S/G system of claim 6 wherein the drive shaft rotatably couples to a turbine and the S/G system is an air turbine starter/generator.

11. The S/G system of claim 6 wherein the second set of windings is selectably connected with the first set of windings and the S/G power output.

12. The S/G system of claim 11 wherein the S/G system operates in the first starting mode, whereby the drive shaft rotatably drives the first rotor to generate current in the first set of windings, wherein the current generated in the first set of windings is supplied to the connected second set of windings, wherein the current supplied to the second set of windings induces rotation of the second rotor, and wherein the rotation of the S/G kinetic input/output operates to start the engine.

13. A gas turbine engine comprising the S/G system of claim 12 wherein S/G kinetic input/output operates to start the gas turbine engine.

14. The S/G system of claim 12 wherein the S/G system operates in the second generating mode, whereby a started gas turbine engine kinetically drives the S/G kinetic input/output, wherein the rotation of the second rotor relative to the second stator generates current in the second set of windings, and wherein the current generated in the second set of windings is supplied to the connected S/G power output.

15. The S/G system of claim 6 wherein at least one of the first rotor or the second rotor is a permanent magnet rotor.

16. The S/G system of claim 6 wherein at least one of the first stator or the second stator can selectably operate with a three-phase stator winding or a six-phase stator winding.

17. The S/G system of claim 16 wherein the at least one of the first stator or the second stator can operate with the six-phase stator winding during the first starting mode, and wherein operating with the six-phase stator winding generates greater torque on the S/G kinetic input/output, compared with operating with the three-phase stator winding.

18. The S/G system of claim 6 wherein a magnetic shield radially separates the first electric machine from the second electric machine.

19. The S/G system of claim 6, further comprising a mechanical power take-off configured to translate power from the engine to the gear box.

20. A starter/generator (S/G) system for an engine, the S/G system comprising:
- a first electric machine having a first rotor rotatable relative to a first stator, the first rotor rotatably coupled to a drive shaft and the first stator having a first set of windings;
- a second electric machine having a second rotor rotatable relative to a second stator and independently rotatable relative to the first stator, the second stator fixed relative to the first stator, the second stator having a second set of windings;
- a S/G housing, wherein the S/G housing includes the first electric machine and the second electric machine, and wherein the S/G housing is apart from the engine;
- an S/G kinetic input/output rotationally coupled with the second rotor, wherein the S/G kinetic input/output is adapted to supply a kinetic output to the engine when the S/G system is operable as a starter, or receive a kinetic input from the engine when the S/G system is operable as a generator; and
- an S/G power output electrically connected with the second set of windings;
- wherein both the first rotor and the second rotor are apart from an engine rotor.

* * * * *